United States Patent
Brill et al.

(10) Patent No.: US 9,660,993 B2
(45) Date of Patent: May 23, 2017

(54) EVENT REPORTING AND HANDLING

(71) Applicants: Jacob Andrew Brill, San Francisco, CA (US); Daniel Gregory Muriello, Palo Alto, CA (US); Andrew Bartholomew, Palo Alto, CA (US)

(72) Inventors: Jacob Andrew Brill, San Francisco, CA (US); Daniel Gregory Muriello, Palo Alto, CA (US); Andrew Bartholomew, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 591 days.

(21) Appl. No.: 13/660,125

(22) Filed: Oct. 25, 2012

(65) Prior Publication Data

US 2014/0123228 A1    May 1, 2014

(51) Int. Cl.
*H04L 29/06*   (2006.01)
*H04L 29/08*   (2006.01)

(52) U.S. Cl.
CPC .......... *H04L 63/10* (2013.01); *H04L 63/1416* (2013.01); *H04L 63/168* (2013.01); *H04L 67/22* (2013.01)

(58) Field of Classification Search
CPC ..... H04L 63/10; H04L 67/22; H04L 63/1416; H04L 63/168
USPC ....................................................... 707/770
See application file for complete search history.

(56) References Cited

U.S. PATENT DOCUMENTS

| | | | | |
|---|---|---|---|---|
| 5,155,842 A | * | 10/1992 | Rubin | G06F 9/542 714/22 |
| 5,542,088 A | * | 7/1996 | Jennings, Jr. | G06F 9/4881 718/103 |
| 5,828,882 A | * | 10/1998 | Hinckley | G06F 9/542 719/318 |
| 6,094,681 A | * | 7/2000 | Shaffer | G06Q 10/10 709/206 |
| 6,167,448 A | * | 12/2000 | Hemphill | G06F 9/542 709/217 |
| 6,185,613 B1 | * | 2/2001 | Lawson | G06F 9/542 709/224 |

(Continued)

FOREIGN PATENT DOCUMENTS

| | | | | |
|---|---|---|---|---|
| CN | WO 2013170805 A1 | * | 11/2013 | H04L 67/22 |
| WO | WO 2008055263 A1 | * | 5/2008 | G06Q 10/00 |

*Primary Examiner* — Phuong Thao Cao
(74) *Attorney, Agent, or Firm* — Baker Botts L.L.P.

(57) ABSTRACT

Particular embodiments may receive and log information related to one or more events occurring on one or more client computing devices associated with a user. An event may comprise a restriction of a user action on a social-networking system, the restriction comprising the social-networking system blocking the user from performing the user action. An event may comprise a login issue associated with logging in to the social-networking system. An event may comprise a system or device error. System errors may comprise events originating from a third-party system. For each event, an indication of the event and at least one user-activatable reference may be provided for display to the user. A control action may then be determined for the event in response to a user selection of the user-activatable reference. An interface may provide third parties with a view of a user's events as well as functionality to effect control actions.

20 Claims, 8 Drawing Sheets

(56) References Cited

U.S. PATENT DOCUMENTS

| | | | |
|---|---|---|---|
| 6,272,559 B1* | 8/2001 | Jones | G06F 9/548 719/330 |
| 6,330,598 B1* | 12/2001 | Beckwith | H04Q 3/0029 709/223 |
| 6,424,354 B1* | 7/2002 | Matheny | G06F 3/0481 345/619 |
| 6,466,949 B2* | 10/2002 | Yang | G06F 17/30368 |
| 6,530,024 B1* | 3/2003 | Proctor | 726/23 |
| 6,584,502 B1* | 6/2003 | Natarajan | H04L 12/2602 709/223 |
| 6,611,227 B1* | 8/2003 | Nebiyeloul-Kifle | G01S 7/4004 180/167 |
| 6,611,881 B1* | 8/2003 | Gottfurcht | G06Q 20/105 705/41 |
| 6,965,917 B1* | 11/2005 | Aloni | G06Q 10/107 709/205 |
| 7,668,809 B1* | 2/2010 | Kelly | G06F 17/30528 705/5 |
| 7,792,256 B1* | 9/2010 | Arledge | H04L 12/2818 348/143 |
| 7,818,800 B1* | 10/2010 | Lemley, III | G06F 21/50 726/22 |
| 7,979,457 B1* | 7/2011 | Garman | G06F 17/30864 705/26.8 |
| 7,979,494 B1* | 7/2011 | Golovin | G06F 21/552 709/206 |
| 8,079,085 B1* | 12/2011 | Wu | G06F 21/55 713/188 |
| 8,082,337 B1* | 12/2011 | Davis | H04L 41/0893 709/223 |
| 8,200,980 B1* | 6/2012 | Robinson | G06Q 20/04 713/186 |
| 8,220,055 B1* | 7/2012 | Kennedy | G06F 21/50 726/22 |
| 8,341,105 B1* | 12/2012 | Gartside | G06N 5/025 706/47 |
| 8,350,694 B1* | 1/2013 | Trundle | G08B 25/08 340/539.11 |
| 8,417,367 B1* | 4/2013 | Logsdon | G06Q 10/06 700/100 |
| 8,428,561 B1* | 4/2013 | Vance | H04W 4/206 455/412.1 |
| 8,522,258 B1* | 8/2013 | Shaw | 719/318 |
| 8,566,947 B1* | 10/2013 | Sankruthi | G06F 21/55 726/22 |
| 8,613,064 B1* | 12/2013 | Roy | G06F 21/316 380/247 |
| 8,966,036 B1* | 2/2015 | Asgekar | G06F 7/00 707/706 |
| 8,994,492 B2* | 3/2015 | Farhan | G05B 9/02 340/10.4 |
| 9,053,307 B1* | 6/2015 | Johansson | G06F 21/316 |
| 9,077,715 B1* | 7/2015 | Satish | H04L 63/10 |
| 9,106,705 B1* | 8/2015 | Tuttle | H04L 63/20 |
| 9,117,197 B1* | 8/2015 | Sharma | G06Q 10/10 |
| 9,215,264 B1* | 12/2015 | Sokolov | H04L 67/02 |
| 9,336,544 B2* | 5/2016 | Nakajima | G06Q 30/06 |
| 2003/0236835 A1* | 12/2003 | Levi | H04L 12/1813 709/204 |
| 2004/0003071 A1* | 1/2004 | Mathew | G06F 17/30867 709/223 |
| 2004/0003279 A1* | 1/2004 | Beilinson | G06F 21/604 726/7 |
| 2004/0049586 A1* | 3/2004 | Ocepek | H04L 29/12009 709/229 |
| 2004/0051731 A1* | 3/2004 | Chang | H04L 69/329 715/734 |
| 2004/0128169 A1* | 7/2004 | Lusen | G06Q 50/24 705/3 |
| 2005/0044382 A1* | 2/2005 | McKeeth | 713/182 |
| 2005/0049933 A1* | 3/2005 | Upendran | G06Q 30/02 705/26.41 |
| 2005/0162965 A1* | 7/2005 | Fukuda | G06F 21/36 365/230.03 |
| 2005/0171832 A1* | 8/2005 | Hull | G06Q 30/0201 705/7.29 |
| 2005/0182924 A1* | 8/2005 | Sauve | G06F 21/51 713/154 |
| 2005/0193144 A1* | 9/2005 | Hassan | G06F 21/31 709/238 |
| 2005/0198287 A1* | 9/2005 | Sauve | G06F 21/52 709/225 |
| 2006/0007901 A1* | 1/2006 | Roskowski et al. | 370/338 |
| 2006/0090183 A1* | 4/2006 | Zito | G06F 17/30035 725/46 |
| 2007/0028291 A1* | 2/2007 | Brennan | H04L 63/1408 726/1 |
| 2007/0028303 A1* | 2/2007 | Brennan | G06F 21/55 726/24 |
| 2007/0044152 A1* | 2/2007 | Newman | G06F 21/554 726/24 |
| 2007/0060305 A1* | 3/2007 | Amaitis | G07F 17/3239 463/25 |
| 2007/0094159 A1* | 4/2007 | Takeo | G06N 99/005 706/12 |
| 2007/0150603 A1* | 6/2007 | Crull et al. | 709/227 |
| 2007/0174832 A1* | 7/2007 | Brehm | G06F 8/61 717/174 |
| 2007/0300292 A1* | 12/2007 | Scipioni | G06F 21/31 726/5 |
| 2008/0005325 A1* | 1/2008 | Wynn | G06Q 10/107 709/225 |
| 2008/0034425 A1* | 2/2008 | Overcash | G06F 21/55 726/22 |
| 2008/0066161 A1* | 3/2008 | Ohhira | H04L 29/12801 726/4 |
| 2008/0120558 A1* | 5/2008 | Nathan | A63F 13/12 715/764 |
| 2008/0134040 A1* | 6/2008 | Pennington | G06F 17/3089 715/733 |
| 2008/0176583 A1* | 7/2008 | Brachet | G01S 5/0236 455/456.3 |
| 2008/0229214 A1* | 9/2008 | Hamilton | H04L 67/22 715/751 |
| 2009/0016615 A1* | 1/2009 | Hull | G06K 9/00463 382/217 |
| 2009/0158311 A1* | 6/2009 | Hon | H04H 60/31 725/14 |
| 2009/0178134 A1* | 7/2009 | Dehaas | G06F 21/62 726/17 |
| 2009/0216831 A1* | 8/2009 | Buckner | G06Q 20/04 709/202 |
| 2009/0217106 A1* | 8/2009 | Lin et al. | 714/47 |
| 2009/0222750 A1* | 9/2009 | Jain | G06Q 10/00 715/767 |
| 2009/0271232 A1* | 10/2009 | Waguet | G06Q 10/06 705/7.36 |
| 2009/0276204 A1* | 11/2009 | Kumar | H04L 63/0227 703/21 |
| 2010/0031361 A1* | 2/2010 | Shukla | G06F 21/568 726/24 |
| 2010/0037324 A1* | 2/2010 | Grant | G06F 21/554 726/27 |
| 2010/0106503 A1* | 4/2010 | Farrell | G10L 17/04 704/246 |
| 2010/0122293 A1* | 5/2010 | Craner | H04N 5/44582 725/40 |
| 2010/0146609 A1* | 6/2010 | Bartlett | G06Q 20/02 726/7 |
| 2010/0299735 A1* | 11/2010 | Jiang | G06F 21/305 726/7 |
| 2010/0306764 A1* | 12/2010 | Khanna | G06F 11/1482 718/1 |
| 2010/0332509 A1* | 12/2010 | Rogers | G06Q 50/26 707/759 |
| 2011/0061013 A1* | 3/2011 | Bilicki | G06Q 10/06 715/771 |

(56) References Cited

U.S. PATENT DOCUMENTS

| | | | |
|---|---|---|---|
| 2011/0087495 A1* | 4/2011 | O'Neill | G06Q 10/10 705/1.1 |
| 2011/0178896 A1* | 7/2011 | Nakajima | G06Q 30/06 705/26.25 |
| 2011/0209192 A1* | 8/2011 | LeClerc Greer | G06F 21/32 726/1 |
| 2011/0225293 A1* | 9/2011 | Rathod | G06F 17/30867 709/224 |
| 2011/0231772 A1* | 9/2011 | Tovar | H04L 63/10 715/736 |
| 2011/0246631 A1* | 10/2011 | Baker | G06Q 10/10 709/223 |
| 2011/0264531 A1* | 10/2011 | Bhatia | G06Q 30/0269 705/14.66 |
| 2011/0270752 A1* | 11/2011 | Neto | G06Q 20/40 705/44 |
| 2011/0276396 A1* | 11/2011 | Rathod | G06F 17/30867 705/14.49 |
| 2011/0314094 A1* | 12/2011 | De Oliveira Antunes | G09B 5/00 709/203 |
| 2012/0005152 A1* | 1/2012 | Westen | G06F 17/3089 707/602 |
| 2012/0089635 A1* | 4/2012 | Elchik | G06F 17/30669 707/769 |
| 2012/0090030 A1* | 4/2012 | Rapaport | H04L 63/1441 726/23 |
| 2012/0151578 A1* | 6/2012 | Niemel | H04L 12/585 726/22 |
| 2012/0158852 A1* | 6/2012 | Goldsmith | G06Q 10/10 709/205 |
| 2012/0166553 A1* | 6/2012 | Rubinstein | G06Q 50/01 709/206 |
| 2012/0167162 A1* | 6/2012 | Raleigh | G06F 21/57 726/1 |
| 2012/0209976 A1* | 8/2012 | McQuade | H04L 41/046 709/223 |
| 2012/0210388 A1* | 8/2012 | Kolishchak | G06F 21/552 726/1 |
| 2012/0221467 A1* | 8/2012 | Hamzeh | G06Q 20/20 705/40 |
| 2012/0250517 A1* | 10/2012 | Saarimaki | H04W 4/001 370/241 |
| 2012/0254312 A1* | 10/2012 | Patel | G06Q 50/01 709/204 |
| 2012/0254419 A1* | 10/2012 | Gilzean | G06Q 10/109 709/224 |
| 2012/0296965 A1* | 11/2012 | Srivastava | G06Q 50/01 709/204 |
| 2013/0007634 A1* | 1/2013 | Galvin, Jr. | G06Q 50/01 715/753 |
| 2013/0031599 A1* | 1/2013 | Luna | G06F 21/554 726/1 |
| 2013/0036230 A1* | 2/2013 | Bakos | H04L 67/22 709/227 |
| 2013/0036459 A1* | 2/2013 | Liberman | H04L 9/0866 726/6 |
| 2013/0073976 A1* | 3/2013 | McDonald | G06Q 10/00 715/739 |
| 2013/0074164 A1* | 3/2013 | Bartlett | G06F 21/31 726/5 |
| 2013/0086179 A1* | 4/2013 | Coleman | H04W 4/12 709/206 |
| 2013/0097253 A1* | 4/2013 | Mencke | G06Q 50/01 709/206 |
| 2013/0103481 A1* | 4/2013 | Carpenter | G06Q 30/0229 705/14.25 |
| 2013/0138225 A1* | 5/2013 | Gordon | G05B 19/0421 700/33 |
| 2013/0173712 A1* | 7/2013 | Monjas Llorente | G06Q 10/00 709/204 |
| 2013/0179203 A1* | 7/2013 | Mullen | G06Q 10/1093 705/7.11 |
| 2013/0226926 A1* | 8/2013 | Beaurepaire | G06K 9/00704 707/740 |
| 2013/0247087 A1* | 9/2013 | Knudson | H04N 5/782 725/28 |
| 2013/0275998 A1* | 10/2013 | Dalcher | G06F 9/542 719/318 |
| 2013/0282812 A1* | 10/2013 | Lessin | H04L 63/10 709/204 |
| 2013/0291110 A1* | 10/2013 | Thadikaran | G06F 21/78 726/23 |
| 2013/0325755 A1* | 12/2013 | Arquette | H04L 51/32 706/12 |
| 2013/0332593 A1* | 12/2013 | Patnaikuni | H04L 29/06884 709/224 |
| 2013/0347078 A1* | 12/2013 | Agarwal et al. | 726/4 |
| 2014/0006494 A1* | 1/2014 | George | H04W 4/206 709/204 |
| 2014/0129942 A1* | 5/2014 | Rathod | H04N 21/44222 715/720 |
| 2014/0184772 A1* | 7/2014 | Hanina | G06F 19/3456 348/77 |
| 2015/0032873 A1* | 1/2015 | Chen | H04L 67/22 709/224 |
| 2015/0112799 A1* | 4/2015 | Lumer | G06Q 30/00 705/14.53 |

\* cited by examiner

EVENT REPORTING AND HANDLING

TECHNICAL FIELD

This disclosure generally relates to reporting of events to users.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users. The social-networking system may transmit over one or more networks content or messages related to its services to a mobile or other computing device of a user. A user may also install software applications on a mobile or other computing device of the user for accessing a user profile of the user and other data within the social-networking system.

SUMMARY OF PARTICULAR EMBODIMENTS

In particular embodiments, events logged by a social-networking system, such as login-related issues, restrictions of user actions in a social-networking system, and system errors, may be reported out to users of the social-networking system. Such events may logged by the social-networking system from one or more client computing devices utilized by a user to access the social-networking system. The user may receive indications of such events on one or more than one of their client computing devices. The event indications may include information regarding the event, as well as an activateable reference (e.g., link, button, or other user control) to take an action in relation to the event, such as requesting more information, or resolving the event.

DESCRIPTION OF PARTICULAR EMBODIMENTS

In particular embodiments, an event may be associated with one or more users of a device or system. As an example, any interaction involving a user may be considered an event. In particular embodiments, an event may be associated with information about the one or more users contained in one or more accounts. As an example and not by way of limitation, an event may be related to a login (e.g., authentication and/or authorization) event. As an example and not by way of limitation, an event may be related to a restriction of a user action taken with respect to a social-networking system or a third-party system. As an example and not by way of limitation, an event may be related to a system error or a device error.

Figure 1A:
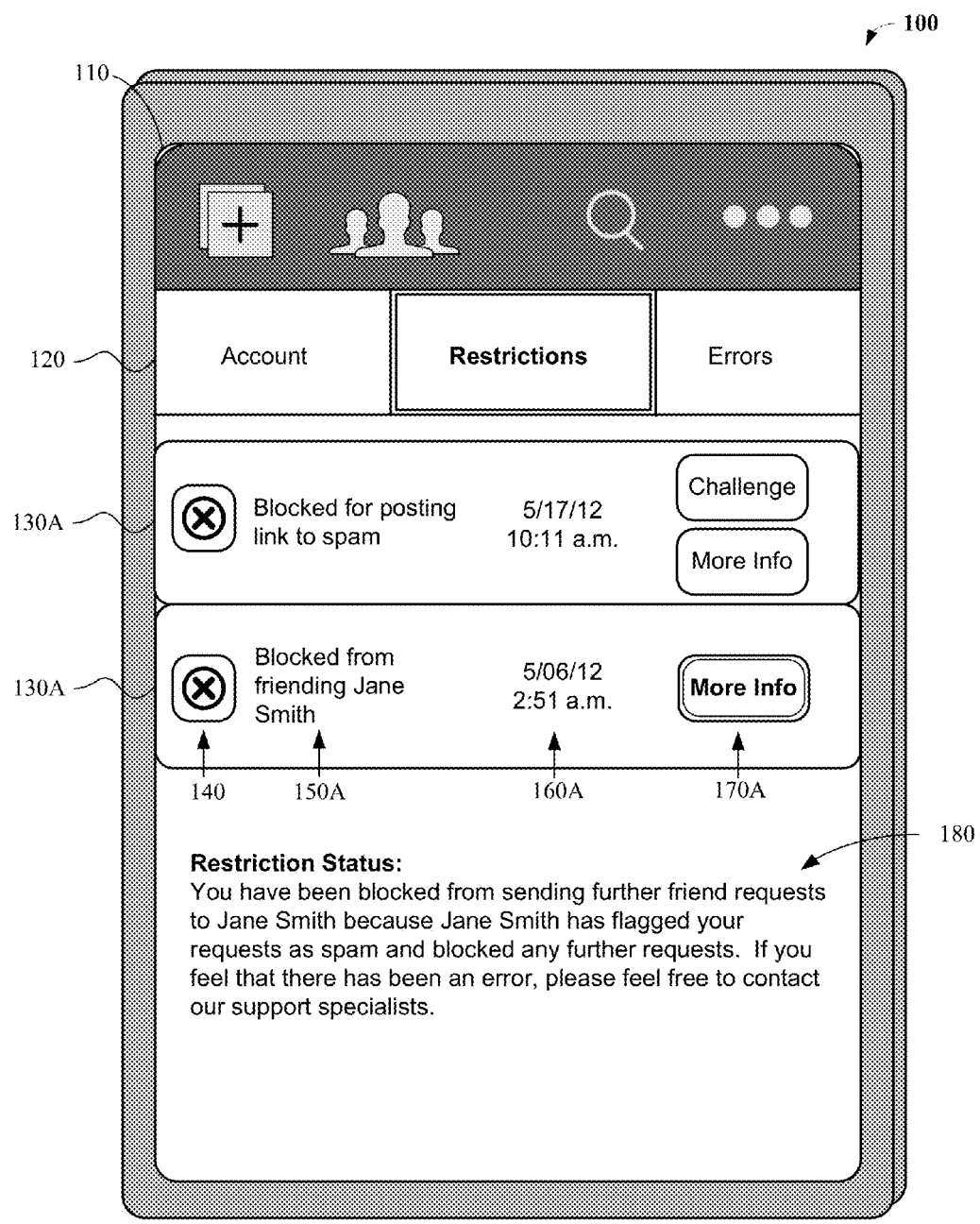
FIGS. 1A-C are example wireframes showing examples of event reporting and handling.
Figure 1B:
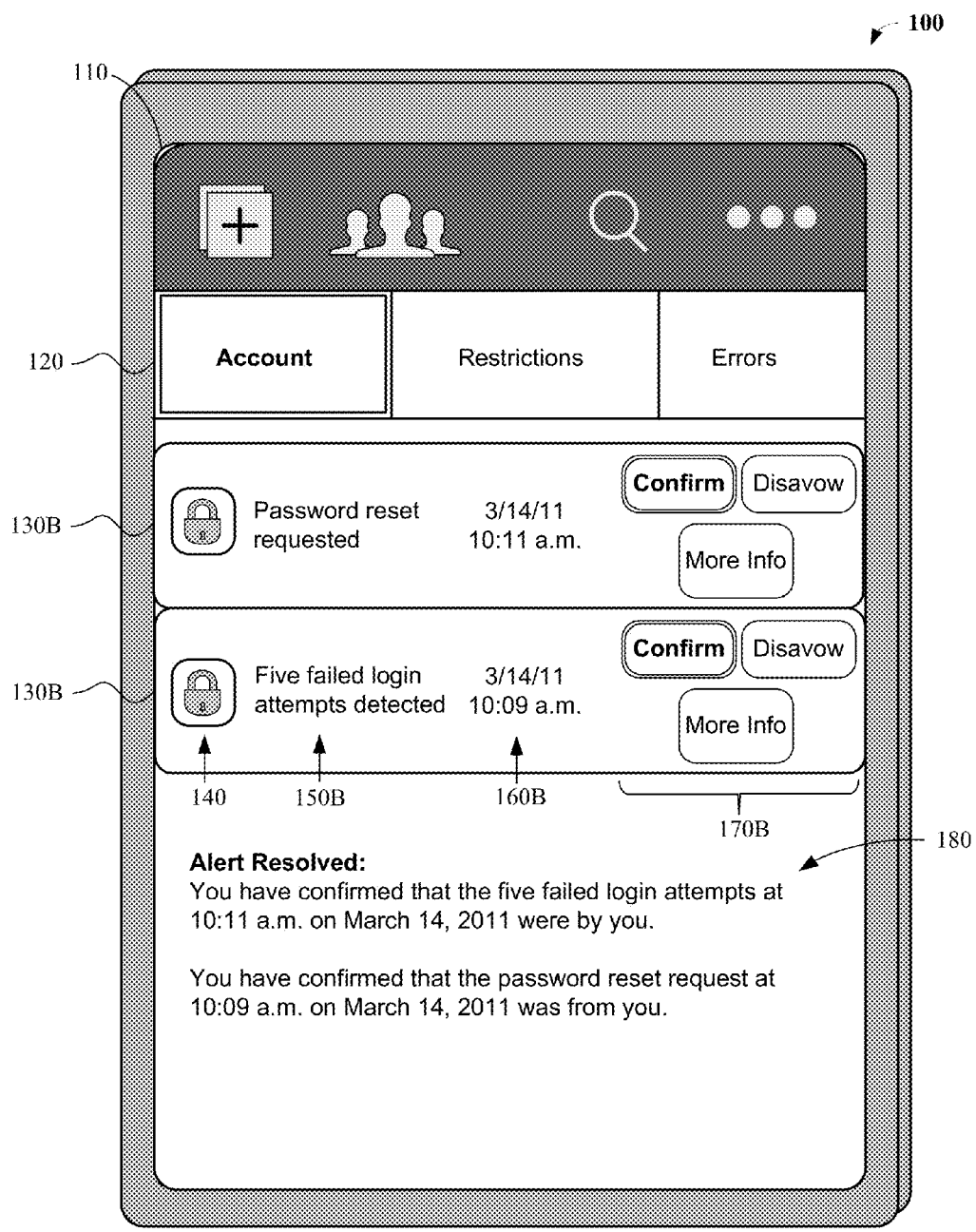
Figure 1C:
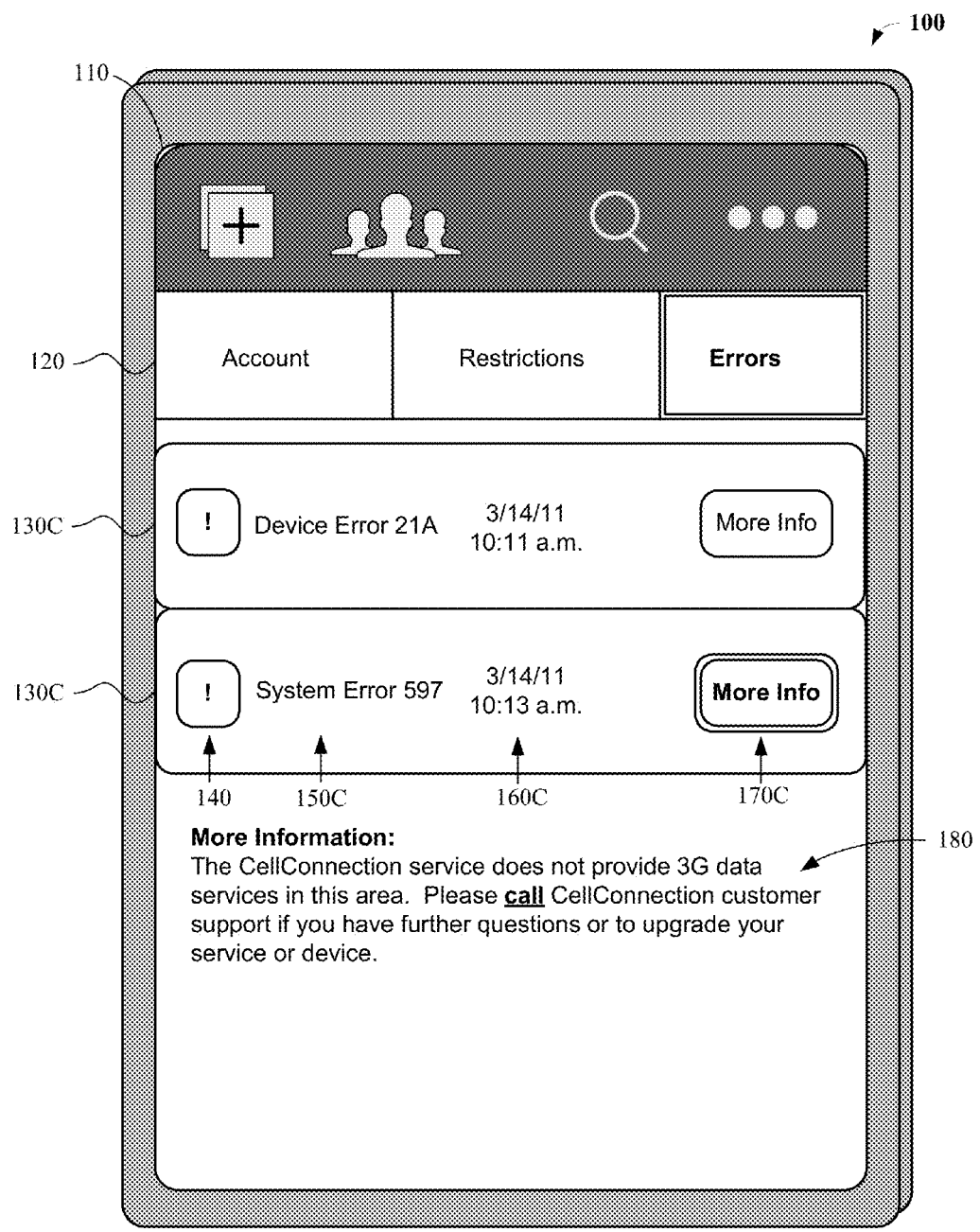

FIGS. 1A-C are example wireframes showing examples of a client computing device interface for event reporting and handling. In these example wireframes, a smartphone 100 includes a display screen 110. Smartphone 100 may be able to connect to a social-networking system by way of a communications network, such as a cell network or Wi-Fi. Particular embodiments of a network environment associated with a social-networking system are described in further detail in FIG. 5 and related text in the specification. As one of skill in the art would be aware, embodiments of the invention may be performed in association with any type of computing device as described in FIG. 6 and related text in the specification.

The user associated with smartphone 100 may be a member of a social-networking system, in which the device user's profile, connection information, and content associations are maintained. The user may be represented by a user node in the social graph. Friends of the user may also be represented by user nodes in the social graph and connected to the user by edges in the social graph representing one or more degrees of separation. Content with which the user is associated may be represented by concept nodes in the social graph. Particular embodiments of the social graph are described in further detail in FIG. 4 and related text in the specification.

In the example wireframes in FIGS. 1A-C, menu bar 120 allows the user to select events within a particular category: Account, Restrictions, or Errors. Events 130 may include an icon 140 corresponding to the category, an indication 150 of the event, a timestamp 160 of the event, and one or more buttons 170 (e.g., a hyperlink, a button, or any other input functionality that can be embodied in an activateable reference). Information area 180 may display further information when a particular event 130 is selected, or when an a particular button 170 is selected.

The example shown in FIG. 1A illustrates example events shown under "Restrictions," which includes all events related to restrictions of the user's actions on the social-networking system. In particular embodiments, a restriction means that the social-networking system is blocking the user from performing some particular user action. For example, in the first event listing 130A, event indication 150A states with respect to a user action: "Blocked for posting link to spam." The user has the option to select the two different buttons 170A: the "Challenge" button, which takes the user through an interface to explain or remediate their user action, and the "More Info" button, which provides a more detailed explanation of the restriction event. In another example, in the second event listing 130A, event indication 150A states with respect to a user action: "Blocked from friending Jane Smith." The user has selected the "More Info" button 170A for this event, and a message providing an explanation of the restriction event is shown in information area 180: "You have been blocked from sending further friend requests to Jane Smith because Jane Smith has flagged your requests as spam and blocked any further requests. If you feel that there has been an error, please feel free to contact our support specialists."

The example shown in FIG. 1B illustrates example events shown under "Account," which includes all events related to login issues. In particular embodiments, a login issue includes at least a suspicious login attempt, a request to reset a password, a request to change a user ID used for authentication, or a request to change a unique user identifier associated with the user. For example, in the first event listing 130B, event indication 150B states with respect to a user action: "Password reset requested." The user has the option to select the three different buttons 170B: the "Confirm" button, which confirms that it was the user who requested this user action, the "Disavow" button, which enables the user to disavow the user action and signal possible account hacking and/or fraud, and the "More Info" button 170B, which will provide a more detailed explanation of the login issue event. In another example, in the second event listing 130B, event indication 150B states with respect to a user action: "Five failed login attempts detected." The user has selected the "Confirm" buttons 170B for both events, and messages notifying the user that the login issue events have been resolved are shown in information area 180: "You have confirmed that the five failed login attempts at 10:11 a.m. on Mar. 14, 2011 were by you. You have confirmed that the password reset request at 10:09 a.m. on Mar. 14, 2011 was from you."

The example shown in FIG. 1C illustrates example events shown under "Error," which may include both system errors and device errors. These types of events may not be triggered by a user action. For example, in the first event listing 130C, event indication 150C states: "Device Error 21A." The user has the option to select the "More Info" button 170C, which will provide a more detailed explanation of the error event. In another example, in the second event listing 130C, event indication 150C states: "System Error 597." The user has selected the "More Info" button 170C for the second event, and an informational message notifying the user that the error event originated from a third-party system (i.e., the network service provider "CellConnection") is shown in information area 180: "More Information: The CellConnection service does not provide 3G data services in this area. Please call CellConnection customer support if you have further questions or to upgrade your service or device." In the example shown in FIG. 1C, the word "call" in information area 180 provides a hyperlink to call customer service agent at CellConnection.

Figure 2:
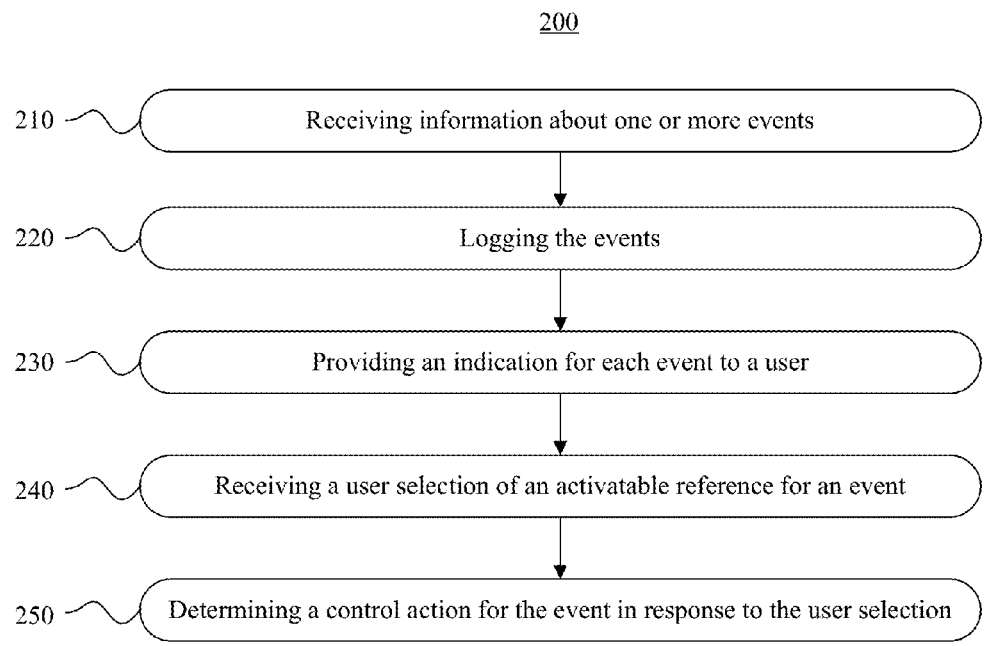
FIG. 2 is a flowchart of an example method according to particular embodiments.

The steps involved in producing the examples shown in FIGS. 1A-C, are described in further detail in FIG. 2 and related text in the specification.

FIG. 2 is a flowchart of an example method for reporting events and providing options for event handling. In step 210, particular embodiments receive information about one or more events. As an example, and not by way of limitation, the example embodiments disclosed herein are described with respect to three categories—login issues, restrictions of user actions, and system/device errors—however, the techniques disclosed herein may be used with any category or type of events.

In particular embodiments, an event may be generated in relation to a login to a device, system, website, application, user interface, or any other suitable access-restricted content. In particular embodiments, a login event may be an attempt by any entity to establish the appropriate credentials to access a device or restricted content. As an example, an attempt to log in to a device such as a desktop computer or mobile phone may be recognized by one or more processors as an event. As another example, an attempt to log in to an application or website, such as a social networking website, may be recognized by one or more processors as an event. As another example, an attempt to log in to restricted functionality on a device, website, or application may be recognized by one or more processors as an event. For example, access to functionality such as editing a document on a word processor or altering content on a filesystem may require a login to access the functionality. This disclosure contemplates any suitable method for logging in or accessing restricted content, such as entering a password, entering a username performing a gesture on a touch-sensitive display, biological detectors such as fingerprint or retinal scanners, a near field communication system, or any suitable combination thereof. A login event may include other login issues, such as detection of a potentially fraudulent attempt to access a user account, to reset a user's password, to reassign the user account to a new username, or to change a unique user identifier associated with the user. While this disclosure provides specific examples of events associated with one or more users' access to restricted devices or content, this disclosure contemplates as an "event" any suitable access to any suitable devices, accounts, or other restricted content.

In particular embodiments, an event associated with one or more users may be a restriction of a user action taken with respect to functionality provided by a system, device, component, or application. As an example and not by way of limitation, a restriction may prevent a user from performing one or more actions a user is ordinarily capable of performing. In particular embodiments, the social-networking system may impose a restriction of a user action by reducing a level of authorization or permissions granted to a user. For example, a user of a social networking website may be prevented from posting content, such as photos, for a specified duration or on a specified platform. As another example, a user of a social networking website may be prevented from posting content or a URL link to content that is known to the social networking system to be spam or otherwise violate the guidelines or terms of service of the website. As another example, a user of a social networking may be prevented from performing certain interactions with other users of a social networking website, for example making friend requests to a particular user after a pre-determined number of friend requests have been made in a pre-determined time period or of a certain type of user of the social networking website. As another example, a user of a device may be restricted from placing repeated telephone calls in a given timeframe to a given telephone number. In particular embodiments, a restriction may limit a user's ability to access content ordinarily available to a user. For example, a user of social networking website or application who has posted content determined to be offensive or in violation of terms or service on another user's profile or space on the social networking website may be temporarily or permanently barred from accessing the other user's content. In particular embodiments, a restriction of a user action may comprise blocking another user's action. For example, the user may have required that every posting on a group's profile is submitted for moderation prior to publication. While the above provides specific examples of events restricting access or functionality ordinarily available to one or more users, this disclosure contemplates as an "event" any suitable restriction on the access or functionality available to a user of any suitable device, system, or social networking website. In addition, removing a restriction or any expansion of one or more users' access or functionality may also be considered an event. In particular embodiments, restrictions of user actions may be further based upon user profile information, interests, connection/relationship information, a history of actions taken with respect to other nodes in the social graph, content associated with the user, or other social-networking information. Social-networking information may also include affinity information for the user according to one or more categories. Particular embodiments of social-networking information are described in further detail in FIG. 4 and related text in the specification.

In particular embodiments, an event may be a system error or a device error. System errors may include unplanned system-wide issues, such as a server failure or network failure, as well as planned events, such as routine system-wide maintenance procedures. System errors may also include issues accessing resources associated with the social-networking system or associated with the client-computing device. System errors may also include software bugs in the social-networking system or on the client-computing device. System errors may be related to the social-networking system or a third-party system, such as, for example, a network service provider, an application service provider, or a content provider.

In step 220, particular embodiments log the events. Events may be logged in association with information indicating where the event originated from: a client computing device, the social-networking system, or a third-party system. If a user uses multiple client computing devices, events may have originated on any of the client computing devices. Particular embodiments may store logged data in any conventional format or structure. Particular embodiments may analyze the events and log only summary or derivative information. Particular embodiments may only log events once a particular threshold has been attained, e.g., only logging a suspicious login issue once five failed login attempts have been detected.

In step 230, particular embodiments provide an indication for each event to a user upon receiving a request to view event indications. In particular embodiments, after one or more processors have determined that an event has occurred one or more entities may be notified of the event. As an example, a user of a social networking website may wish to be notified of restrictions placed on their account, login attempts or other access events, changes to the account, or any other suitable events. An event indication may contain textual, graphic, or other information about the corresponding event. The event indication may provide the user with information regarding a requirement for confirmation, a requirement for authorization, a requirement for authentication, a selectable option, an opportunity to submit further user input, a restriction, a warning, a security alert, or a recommendation. The event indication may also be provided together with one or more activateable references (e.g., link, button, checkbox, radio button, drop-down listbox, slider bar, handle, dial, text entry box, or other user control) to take an action in relation to the event, such as requesting more information, or resolving the event. As shown in the example wireframes of FIGS. 1A-C, the event indications may be organized for display in accordance with particular categories: Account, Restrictions, or Errors.

Event indications may be stored on a device or network, providing the user with access to previous event indications. In particular embodiments, all event indications available to a user may be presented in a single accessible area. As an example, a file or application may contain all event indications, allowing a user to navigate among the event indications available to the user. In particular embodiments, a service provider, such as a provider of a wireless communications network, associated with a system or device may wish to be notified of an event. As an example, a customer service division of a cellular telephone service provider may wish to be notified that an event related to the service has occurred. As for the user, event indications may be stored and accessible to the carrier at any time. In particular embodiments, the information accompanying an event indication and its presentation may be the same for a service provider as they are for the user. In particular embodiments, event indications, accompanying information, and their display may be different for a third party than they are for the user. For example, the information delivered to a service provider may contain more technical information regarding an error and its cause than the information delivered to the user. The event indications may also be configured for display in accordance with display capabilities of the requesting device. For example, on a small screen, such as the smartphone-style screen in FIGS. 1A-C, only one particular category of event indications may be displayed at a time. In another example, a tablet-style computer may provide sufficient screen real estate to display all three categories of event indications at once. While the above provides specific examples of the types of entities that may wish to be notified of an event, this disclosure contemplates any suitable entity being notified of any suitable event.

In particular embodiments, event indications may be stored by or delivered to any suitable component of any suitable network. As an example, a user may select one or more devices as delivery points for all event indications associated with the user. The event indications may be stored on the device, and the user may select any suitable event indications to retain or discard. As another example, event indications relating to a particular service provider or device may be delivered to the relevant division of the service provider or device manufacturer or retailer. As another example, event indications may be delivered to particular account associated with a user, for example a user's social networking profile. In this example, event indications would be accessible through any device accessing the user's social networking profile. While this disclosure provides specific examples of the delivery points of event indications, this disclosure contemplates any suitable delivery points for event indications, including delivering event indications to any suitable combination of the delivery points described above.

An event indication may take any suitable form. In particular embodiments, an event indication may be an audio cue such as a sound played through the speaker of a device. In particular embodiments, an event indication may be a tactile cue such as a vibration of a device. In particular embodiments, an event indication may be a visual cue. As an example, an event indication may be an illumination of an LED. As another example, an event indication may be a graphically-generated icon or alphanumeric string displayed on a device. In particular embodiments, an event indication may include or be accompanied by any suitable elements or information. As an example, an event indication may include a message labeling or describing the event and the time of the event.

In step 240, particular embodiments receive a user selection of an activatable reference for an event. The user selection may be entered by the user on a client computing device. The user selection may be entered by way of any input technique, including but not limited to: a swipe gesture, a click on a link, a click on an image, entry of a valid password, provision of valid biometric identification, a voice command, activation of a touch sensor of the device, activation of a gyroscope of the device, or activation of an accelerometer of the device. The user selection may signify that the user has dismissed the event indication, requested more information regarding the event indication, confirmed the event, authorized the event, disavowed the event, submitted a question about the event, challenged the event, or resolved the event. Particular embodiments may update a user profile or a social graph associated with the social-networking system with information associated with the user selection. For example, when a user confirms that some user action that was initially flagged as potentially suspicious was indeed taken by the user, access restrictions placed upon the user's profile may be lifted. In another example, where the user authorizes publication of a user posting content on their profile, an edge may be generated in a social graph, in order to associate the posted content with the user's profile.

In step 250, particular embodiments determine a control action for the event in response to the user selection. The control action may include one or more of several different actions, such as, for example: sending additional information for the user, updating the event indication, configuring authorization settings for the user, configuring account settings for the user, configuring permissions for the user with respect to another user, configuring permissions for the user with respect to particular functionality, temporarily suspending the user's access to information, or assessing a penalty for the user. For example, updating the event indication may include updating an icon, text, or images associated with the event indication, and may also include updating the corresponding activatable reference(s) to reflect a result of the control action. In another example, configuring permissions for the user with respect to another user may comprise placing the user on a black list or grey list with respect to the other user. In another example, configuring permissions for the user with respect to particular functionality may comprise preventing the user from playing a particular game or participating in a particular group function. In another example, assessing a penalty for the user may comprise imposing a fine upon the user for violating particular rules or exceeding particular thresholds (e.g., data transfer maximums).

Figure 3:
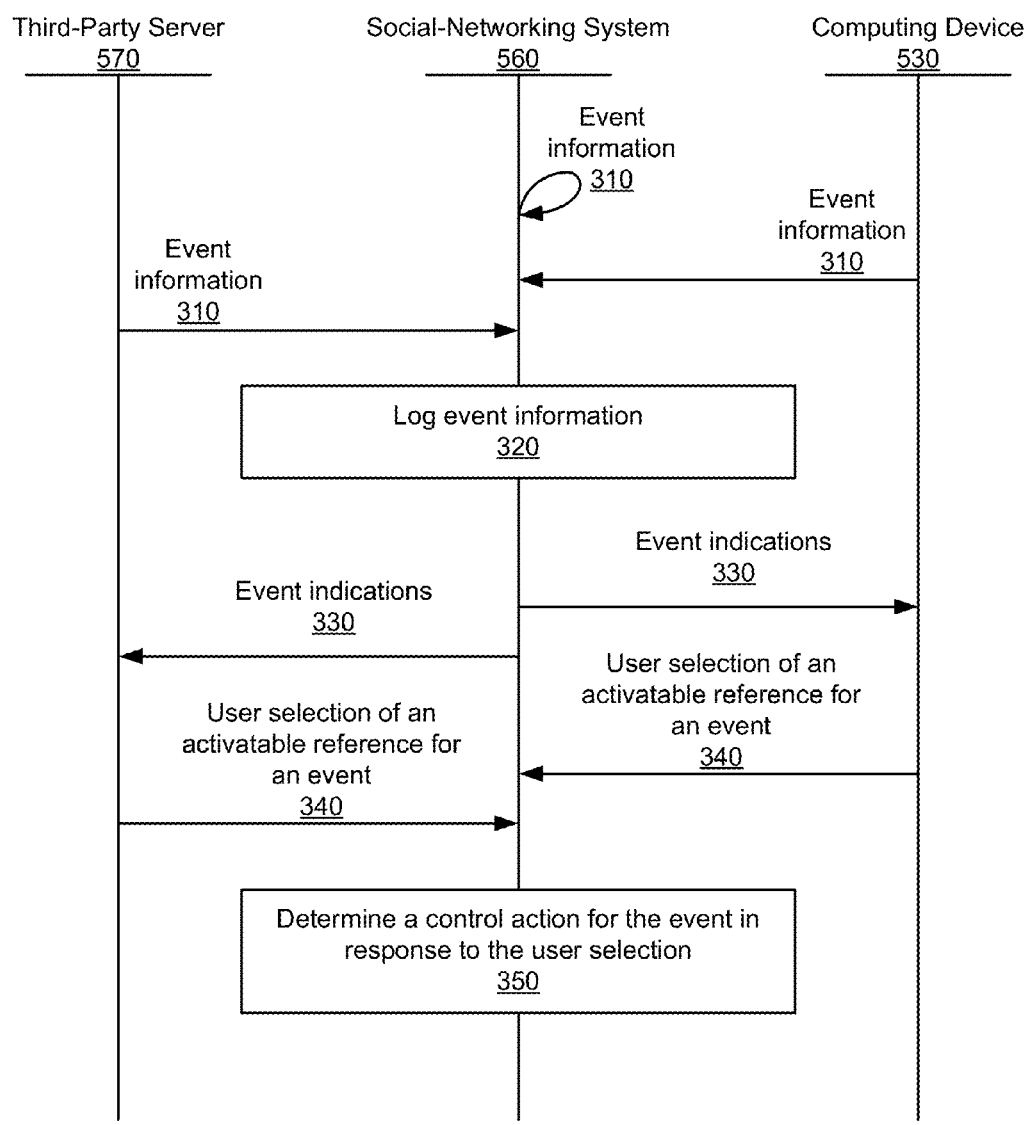
FIG. 3 is an interaction diagram of a process according to particular embodiments.

FIG. 3 is an interaction diagram of a process for reporting events and providing event-handling options. Process interactions may take place between a social-networking system 560 (as described in further detail with respect to FIG. 5) and a client computing device 530. In particular embodiments, process interactions may also take place between the social-networking system 560 and a third-party server 570 associated with a third-party system.

The social-networking system 560 may receive event information 310 from different sources, such as client computing device 530 or a third-party server 570, or it may receive event information 310 generated internally within the social networking system 560 itself. Social networking system 560 may then log the event information 320. Depending upon the context, social networking system 560 may provide event indications to client computing device 530, such as, for example, in the case where the user wishes to view event indications on their personal device. In another context, social networking system 560 may provide event indications 330 to third-party server 570, such as, for example, in the case where a systems administrator, customer service representative, or sales person associated with the third-party system requests access to event indications. In either context, the person viewing the event indications may generate a user selection of an activatable reference for an event 340. Upon receiving the user selection, social-networking system 560 determines a control action for the event in response to the user selection 350. In the context involving a third-party system, the control action may comprise sending information about the user selection of the user-activatable reference to a third-party system, providing additional information received from the third-party system to the user, providing the user with contact information for an agent of the third party, providing information to the third-party system about a restriction of a user action, or providing information to the third-party system about a login issue.

Particular embodiments may provide an interface for third-party systems to access the social-networking system so that the social-networking system can receive information associated with events, provide information associated with events, receive information associated with control actions, or provide information in association with control actions. Such an interface may be based on any conventional interprocess communication technology, such as, by way of example and without limitation, an application programming interface ("API"), web services, CORBA, SOAP, REST, JSON, DCOM, or SAP RFC.

Figure 4:
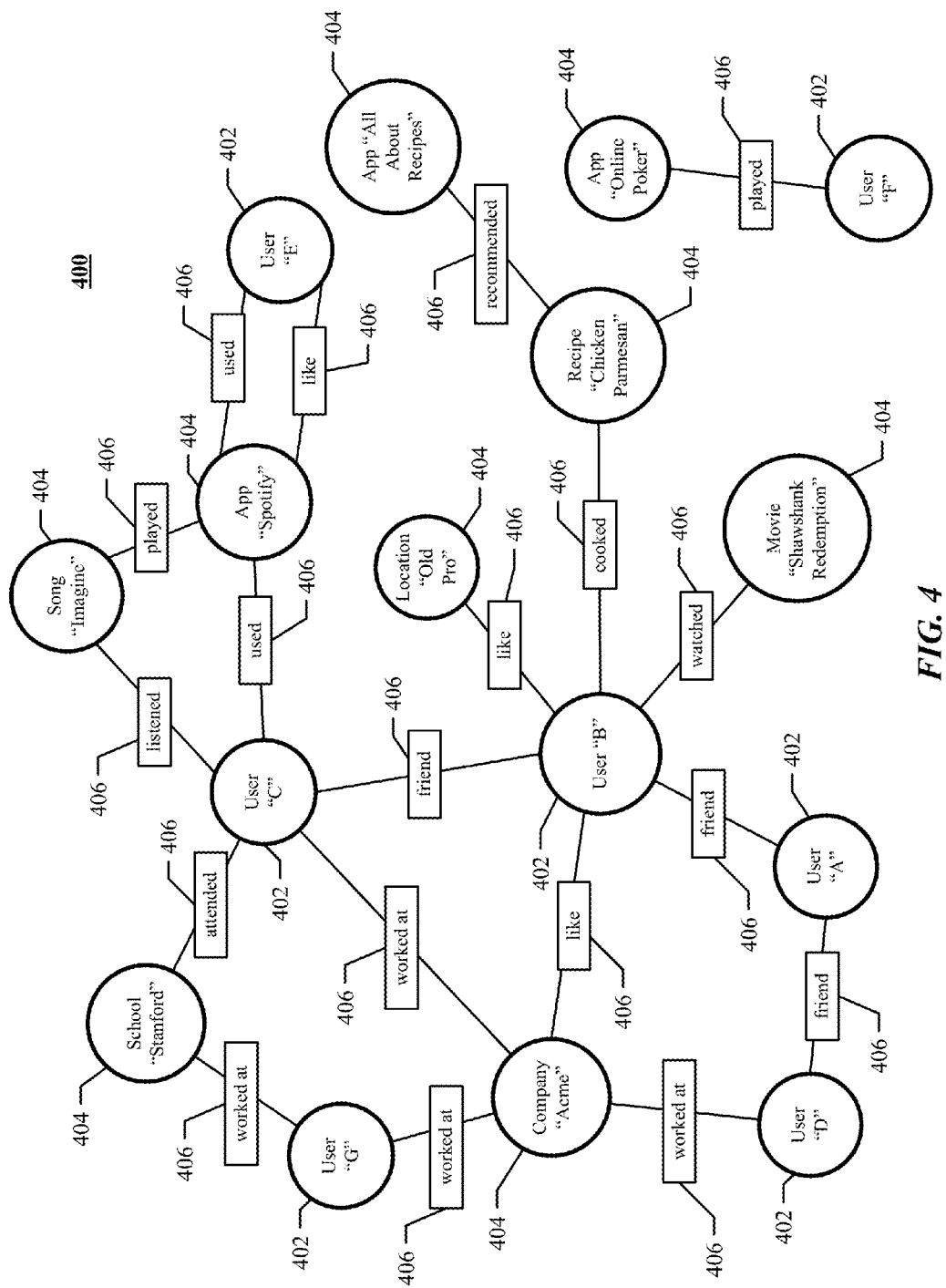
FIG. 4 is a block diagram of an example social graph.

FIG. 4 illustrates example social graph 400. In particular embodiments, social-networking system 560 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 560, client system 530, or third-party system 570 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 560. In particular embodiments, a user node 402 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages or one or more user-profile pages (which may be webpages).

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to a webpage.

In particular embodiments, a node in social graph 400 may represent or be represented by a webpage (which may be referred to as a "profile page"). Profile pages may be hosted by or accessible to social-networking system 560. Profile pages may also be hosted on third-party websites associated with a third-party server 570. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 530 to transmit to social-networking system 560 a message indicating the user's action. In response to the message, social-networking system 560 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 560 may transmit a "friend request" to the second user. If the second user confirms the "friend request," social-networking system 560 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 560 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 560 may create an edge 406 between a user node 402 and a concept node 404 in social graph 400. As an example and not by way of limitation, a user viewing a concept-profile page (such as, for example, by using a web browser or a special-purpose application hosted by the user's client system 530) may indicate that he or she likes the concept represented by the concept node 404 by clicking or selecting a "Like" icon, which may cause the user's client system 530 to transmit to social-networking system 560 a message indicating the user's liking of the concept associated with the concept-profile page. In response to the message, social-networking system 560 may create an edge 406 between user node 402 associated with the user and concept node 404, as illustrated by "like" edge 406 between the user and concept node 404. In particular embodiments, social-networking system 560 may store an edge 406 in one or more data stores. In particular embodiments, an edge 406 may be automatically formed by social-networking system 560 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
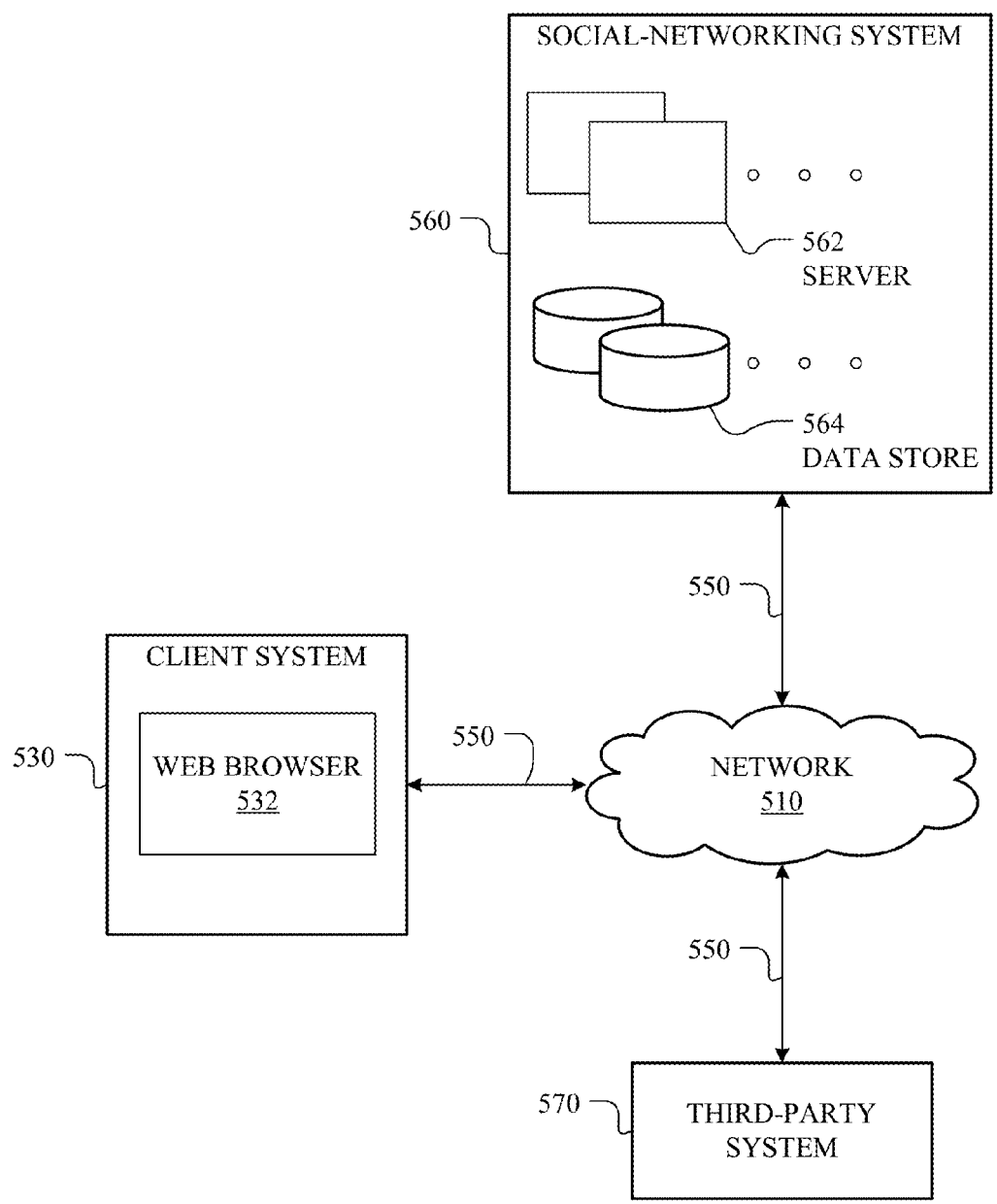
FIG. 5 is a block diagram of an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user.

This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and transmit social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 564 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplate any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (i.e., relationships) to a number of other users of social-networking system 560 whom they want to be connected to. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Ad-pricing modules may combine social information, the current time, location information, or other suitable information to provide relevant advertisements, in the form of notifications, to a user.

Figure 6:
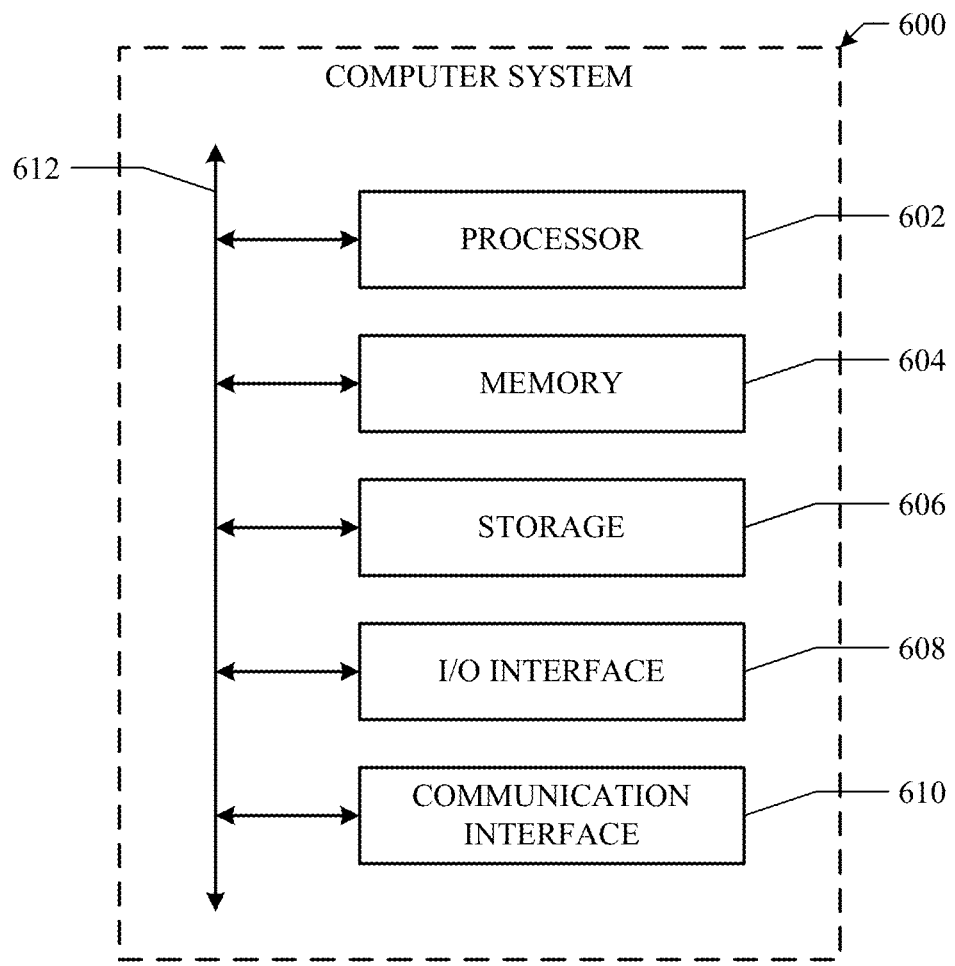
FIG. 6 is a block diagram of an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, I/O interface 608 may include additional hardware, software, or both to support one or more sensors to provide additional information, such as, for example and without limitation: a touch sensor (disposed, for example, on a display of the device, the back of the device and/or one or more lateral edges of the device) for detecting a user touching the surface of the mobile electronic device (e.g., using one or more fingers); an accelerometer for detecting whether the personal computing device 200 is moving and the speed of the movement; a thermometer for measuring the temperature change near the personal computing device 200; a proximity sensor for detecting the proximity of the personal computing device 200 to another object (e.g., a hand, desk, or other object); a light sensor for measuring the ambient light around the personal computing device 200; an imaging sensor (e.g., camera) for capturing digital still images and/or video of objects near the personal computing device 200 (e.g., scenes, people, bar codes, QR codes, etc.); a location sensor (e.g., Global Positioning System (GPS)) for determining the location (e.g., in terms of latitude and longitude) of the mobile electronic device; a sensor for detecting communication networks within close proximity (e.g., near field communication (NFC), Bluetooth, RFID, infrared); a chemical sensor; a biometric sensor for biometrics-based (e.g., fingerprint, palm vein pattern, hand geometry, iris/retina, DNA, face, voice, olfactory, sweat) authentication of a user; etc.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network, or an antenna. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by a computing device, logging one or more events occurring on one or more client computing devices associated with a user of a social-networking system, each of one or more of the events comprising a restriction of a user action on the social-networking system, the restriction comprising the social-networking system blocking the user from interacting with another user of the social-networking system;

by the computing device, providing for display an indication of each of one or more of the events and one or more user-activatable references for each of one or more of the events, wherein the indication comprises information about the event, and each user-activatable reference is configured to take an action in relation to the event, the action comprising requesting more information or resolving the event;

by the computing device, receiving, from the user, a selection of the user-activatable reference, wherein the selection signifies that the user has dismissed the indication, requested more information regarding the indication, confirmed the event, authorized the event, disavowed the event, submitted a question about the event, challenged the event, or resolved the event; and by the computing device, determining a control action associated with the event in response to the selection of the user-activatable reference, wherein the control action comprises sending additional information explaining the event for the user, updating the indication, configuring authorization settings for the user, configuring account settings for the user, configuring permissions for the user with respect to another user, configuring permissions for the user with respect to particular functionality, temporarily suspending the user's access to information, or assessing a penalty for the user.

2. The method of claim 1, each of one or more of the events further comprising a system or device error, wherein the system or device error is a result of: a software bug in the social-networking system or on the one or more client computing devices, issues accessing resources associated with the social-networking system or associated with the one or more client computing devices, or routine procedures associated with the social-networking system or associated with the one or more client computing devices.

3. The method of claim 1, each of one or more of the events further comprising a login issue associated with logging in to the social-networking system,
wherein the login issue comprises a suspicious login, a request to reset a password, a request to change a user ID used for authentication, or a request to change a unique user identifier associated with the user.

4. The method of claim 1, wherein the restriction comprises the social-networking system blocking the user from performing the user action and further comprises the social-networking system reducing a level of authorization or permissions granted to the user.

5. The method of claim 1, further comprising:
by computing device, detecting the selection of the user-activatable reference, wherein the selection comprises a swipe gesture, a click on a link, a click on an image, entry of a valid password, provision of valid biometric identification, a voice command, activation of a touch sensor of the one or more client computing devices, activation of a gyroscope of the one or more client computing devices, or activation of an accelerometer of the one or more client computing devices.

6. The method of claim 1, wherein information logged about the event was received from a third-party system.

7. The method of claim 1, wherein the indication of an event provides the user with information regarding a requirement for confirmation, a requirement for authorization, a requirement for authentication, a selectable option, an opportunity to submit further user input, a restriction, a warning, a security alert, or a recommendation.

8. One or more computer-readable non-transitory storage media embodying software that, when executed, is configured to:
by a computing device, log one or more events occurring on one or more client computing devices associated with a user of a social-networking system, each of one or more of the events comprising a restriction of a user action on the social-networking system, the restriction comprising the social-networking system blocking the user from interacting with another user of the social-networking system;
by the computing device, provide for display an indication of each of one or more of the events and one or more user-activatable references for each of one or more of the events,
wherein the indication comprises information about the event, and each user-activatable reference is configured to take an action in relation to the event, the action comprising requesting more information or resolving the event;
by the computing device, receive, from the user, a selection of the user-activatable reference, wherein the selection signifies that the user has dismissed the indication, requested more information regarding the indication, confirmed the event, authorized the event, disavowed the event, submitted a question about the event, challenged the event, or resolved the event; and
by the computing device, determine a control action associated with the event in response to the selection of the user-activatable reference, wherein the control action comprises sending additional information explaining the event for the user, updating the indication, configuring authorization settings for the user, configuring account settings for the user, configuring permissions for the user with respect to another user, configuring permissions for the user with respect to particular functionality, temporarily suspending the user's access to information, or assessing a penalty for the user.

9. The one or more computer-readable non-transitory storage media of claim 8, wherein information logged about the event was received from a third-party system.

10. The one or more computer-readable non-transitory storage media of claim 9, wherein the third-party system is operated by a telecommunications service provider that provides network services for a client computing device associated with the user.

11. The one or more computer-readable non-transitory storage media of claim 9, each of one or more of the events further comprising a system error, wherein the system error comprises an error originating with the third-party system.

12. The one or more computer-readable non-transitory storage media of claim 8, the software further configured to, when executed, detect the selection of the user-activatable reference, wherein the selection comprises a swipe gesture, a click on a link, a click on an image, entry of a valid password, provision of valid biometric identification, a voice command, activation of a touch sensor of the one or more client computing devices, activation of a gyroscope of the one or more client computing devices, or activation of an accelerometer of the one or more client computing devices.

13. The one or more computer-readable non-transitory storage media of claim 8, the control action comprising sending information about the selection of the user-activatable reference to a third-party system, providing additional information received from the third-party system to the user, providing the user with contact information for an agent of a third party, providing information to the third-party system about a restriction of a user action, or providing information to the third-party system about a login issue.

14. The one or more computer-readable non-transitory storage media of claim 8, the software further configured to, when executed, provide an interface to the social-networking system by which the social-networking system can receive information associated with events, provide information associated with events, receive information associated with control actions, or provide information in association with control actions.

15. A system comprising:
one or more processors; and
a memory coupled to the one or more processors comprising instructions executable by the one or more processors, the one or more processors configured, when executing the instructions, to:
log one or more events occurring on one or more client computing devices associated with a user of a social-networking system, each of one or more of the events comprising a restriction of a user action on the social-networking system, the restriction comprising the social-networking system blocking the user from interacting with another user of the social-networking system;
provide for display an indication of each of one or more of the events and one or more user-activatable references for each of one or more of the events, wherein the indication comprises information about the event, and each user-activatable reference is configured to take an action in relation to the event, the action comprising requesting more information or resolving the event;

receive, from the user, a selection of the user-activatable reference, wherein the selection signifies that the user has dismissed the indication, requested more information regarding the indication, confirmed the event, authorized the event, disavowed the event, submitted a question about the event, challenged the event, or resolved the event; and determine a control action associated with the event in response to the selection of the user-activatable reference, wherein the control action comprises sending additional information explaining the event for the user, updating the indication, configuring authorization settings for the user, configuring account settings for the user, configuring permissions for the user with respect to another user, configuring permissions for the user with respect to particular functionality, temporarily suspending the user's access to information, or assessing a penalty for the user.

16. The system of claim 15, each of one or more of the events further comprising a login issue associated with logging in to the social-networking system, wherein the login issue comprises a suspicious login, a request to reset a password, a request to change a user ID used for authentication, or a request to change a unique user identifier associated with the user.

17. The system of claim 15, the one or more processors further configured, when executing the instructions, to detect the selection of the user-activatable reference, wherein the selection comprises a swipe gesture, a click on a link, a click on an image, entry of a valid password, provision of valid biometric identification, a voice command, activation of a touch sensor of the one or more client computing devices, activation of a gyroscope of the one or more client computing devices, or activation of an accelerometer of the one or more client computing devices.

18. The system of claim 15, wherein the restriction comprises the social-networking system blocking the user from performing the user action and further comprises the social-networking system reducing a level of authorization or permissions granted to the user.

19. The system of claim 15, wherein an event further comprises a device error associated with another client computing device associated with the user.

20. The system of claim 15, wherein the indications are organized for display in accordance with display capabilities of the one or more client computing devices.

* * * * *